United States Patent [19]
Asano et al.

[11] Patent Number: 4,584,084
[45] Date of Patent: Apr. 22, 1986

[54] DURABLE ELECTRODE FOR ELECTROLYSIS AND PROCESS FOR PRODUCTION THEREOF

[75] Inventors: Hiroshi Asano, Kanagawa; Takayuki Shimamune, Tokyo; Kazuhiro Hirao; Ryuta Hirayama, both of Kanagawa, all of Japan

[73] Assignee: Permelec Electrode Ltd., Kanagawa, Japan

[21] Appl. No.: 707,988

[22] Filed: Mar. 4, 1985

[30] Foreign Application Priority Data

Mar. 2, 1984 [JP] Japan ............................ 59-38733

[51] Int. Cl.$^4$ .................... C25B 11/00; B05D 5/12
[52] U.S. Cl. ............................ 204/290 F; 427/125; 427/126.4; 427/126.5; 427/126.6
[58] Field of Search ................. 204/290 F; 427/125, 427/126.4, 126.5, 126.6

[56] References Cited

U.S. PATENT DOCUMENTS 3,882,002  5/1975  Cook .......................... 204/290 F
4,446,245  5/1984  Hinden ....................... 204/290 F Primary Examiner—John F. Niebling
Attorney, Agent, or Firm—Sughrue, Mion, Zinn, Macpeak and Seas

[57] ABSTRACT

An electrolytic electrode which exhibits high durability when used in electrochemical processes in which the generation of oxygen is involved and a process for the production of the same. The electrolytic electrode comprises
(a) an electrode substrate of an electrically-conductive metal;
(b) an electrode coating of an electrode active substance; and
(c) an intermediate layer provided between the electrode substrate (a) and the electrode coating (b), wherein the intermediate layer (c) comprises a mixed oxide of
(i) an oxide of at least one member selected from the group consisting of titanium (Ti) and tin (Sn), each having a valence number of 4, in an amount of 60 to 95% by weight based on the weight of metal, and
(ii) an oxide of at least one member selected from the group consisting of aluminum (Al), gallium (Ga), iron (Fe), cobalt (Co), nickel (Ni) and Thallium (Tl), each having a valence number of 2 or 3, in an amount of about 5 to about 40% by weight based on the weight of metal.

9 Claims, No Drawings

DURABLE ELECTRODE FOR ELECTROLYSIS AND PROCESS FOR PRODUCTION THEREOF

FIELD OF THE INVENTION

The present invention relates to electrodes for electrolysis (hereinafter referred to as "electrolytic electrodes") and to a process for the production of the same. More particularly, the present invention relates to electrolytic electrodes showing high durability, i.e., a long service life, when used in electrochemical processes, e.g., an aqueous solution in which the generation of oxygen at the anode is involved, and a process for the production of the same.

BACKGROUND OF THE INVENTION

Heretofore, electrolytic electrodes comprising a substrate of valve metals, e.g., titanium (Ti), have been used as superior insoluble metal electrodes in the field of electrochemistry. In particular, they have been widely used as anodes for the generation of chlorine in the salt (sodium chloride) electrolytic industry. In addition to Ti, tantalum (Ta), niobium (Nb), zirconium (Zr), hafnium (Hf), vanadium (V), molybdenum (Mo), tungsten (W), etc. are known as valve metals.

These metal electrodes are produced by coating metallic titanium with various electrochemically active substances such as platinum group metals and their oxides. Examples of such platinum group metals and their oxides are described in, e.g., U.S. Pat. Nos. 3,632,498 and 3,711,385. These electrodes can maintain a low chlorine overvoltage over a long period of time as electrodes for the generation of chlorine.

However, when the above metal electrodes are used as anodes in electrolysis for the generation of oxygen or electrolysis in which the generation of oxygen is involved, the anode overvoltage gradually increases. In extreme cases, the anode is passivated and thus it becomes impossible to continue the electrolysis.

The phenomenon of passivation of the anode is believed to be caused mainly by the formation of electrically non-conductive titanium oxides that result from (1) the oxidation of the titanium base material with oxygen by the electrode coating-constituting oxide substance itself; (2) oxygen diffusion-permeating through the electrode coating; or (3) the electrolyte.

Formation of such electrically non-conductive oxides in the interface between the base material and the electrode coating causes the electrode coating to peel off. This creates problems such as a breakdown of the electrode.

Electrochemical processes in which the anode product is oxygen, or where oxygen is generated at the anode as a side reaction, include: (1) electrolysis using a sulfuric acid bath, a nitric acid bath, an alkali bath or the like; (2) electrolytic separation of chromium (Cr), copper (Cu), zinc (Zn), or the like; (3) various types of electroplating: (4) electrolysis of dilute salt, sea water, hydrochloric acide, or the like; and (5) electrolysis for the production of chlorate, and so forth. These processes are all industrially important. However, the above-described problems have hindered metal electrodes from being used in these processes.

U.S. Pat. No. 3,775,284 discloses a technique to overcome passivation of the electrode due to permeation of oxygen. In this technique, a barrier layer of a platinum (Pt)-iridium (Ir) alloy, or of an oxide of cobalt (Co), manganese (Mn) lead (Pb) palladium (Pd), and Pt is provided between the electrically-conductive substrate and the electrode coating.

The substances forming the intermediate barrier layer prevent the diffusion-permeation of oxygen during electrolysis to some extent. However, these substances are electrochemically very active and therefore, react with the electrolyte passing through the electrode coating. This produces electrolytic products, e.g., gas, on the surface of the intermediate barrier layer which gives rise to additional problems. For example, the adhesion of the electrode coating is deteriorated due to physical and chemical influences of the electrode coating peeling off before the life of the substance of the electrode coating is over. Another problem is the corrosion resistance of the resulting electrodes is poor. Thus, the method disclosed in U.S. Pat. No. 3,775,284 fails to produce electrolytic electrodes which have high durability.

Japenese Patent Application (OPI) No. 40381/76 the term "OPI" used herein refers to a "Published Unexamined Patent Application") discloses an intermediate coating layer comprising tin oxide doped with antimony oxide for coating the anode. However, the anode used is an anode intended for the generation of chlorine, and hence an electrode provided with an intermediate coating forming substance disclosed in the above publication does not show the generation of oxygen.

U.S. Pat. No. 3,773,555 discloses an electrode in which a layer of an oxide of, e.g., Ti, and a layer of a platinum group metal or an oxide thereof are laminated and coated on the electrode. However, this electrode has the problem that when it is used in electrolysis in which the generation of oxygen is involved, passivation occurs.

SUMMARY OF THE INVENTION

The present invention provides the ability to overcome the above-described problems. More specifically, an object of the present invention is to provide electrolytic electrodes which are especially suitable for use in electrolysis in which the generation of oxygen is involved, i.e., which resist passivation and have high durability.

Another object of the present invention is to provide a process for producing such electrolytic electrodes.

The above described objects are met by:

(I) an electrolytic electrode comprising
 (a) an electrode substrate of an electrically-conductive metal;
 (b) an electrode coating of an electrode active substance; and
 (c) an intermediate layer provided between the electrode substrate (a) and the electrode coating (b), wherein the intermediate layer (c) comprises a mixed oxide of
   (i) an oxide of at least one member selected from the group consisting of titanium (Ti) and tin (Sn), each having a valence number of 4 in an amount of 60 to 95% by weight based on the weight of metal, and
   (ii) an oxide of at least one member selected from the group consisting of aluminum (Al), gallium (Ga), iron (Fe), cobalt (Co), nickel (Ni) and thallium (Tl), each having a valance number of 2 or 3 in an amount of 5 to 40% by weight based on the weight of metal; and (II) a process for producing an electrolytic electrode, comprising the steps of:

(1) coating an electrode substrate of an electrically conductive metal with a solution containing
 (i) salt(s) of Ti and/or Sn, and
 (ii) salt(s) of at least one metal selected from the group consisting of Al, Ga, Fe, Co, Ni and Tl to provide a coated substrate;
(2) heating in an oxidizing atmosphere the electrode substrate coated with the solution in step (1), thereby forming on the electrode substrate an intermediate layer comprising a mixed oxide of
 (i) an oxide of at least one member selected from the group consisting of Ti and Sn in an amount of about 60 to about 95% by weight based on the weight of metal, and
 (ii) an oxide of at least one member selected from the group consisting of Al, Ga, Fe, Co, Ni and Tl, in an amount of about 5 to about 40% by weight based on the weight of metal; and
(3) subsequently coating the intermediate layer with a layer of an electrode active substance.

DETAILED DESCRIPTION OF THE INVENTION

The present invention is based on the discovery that the provision of the intermediate layer between the substrate and the electrode coating enables one to obtain an electrode which can be used with sufficient durability as an anode for electrochemical processes in which the generation of oxygen is involved.

The intermediate layer of the present invention is corrosion-resistant and is electrochemically inactive. A function of the intermediate layer is to protect the electrode substrate, e.g., Ti, so as to prevent passivation of the electrode without reducing its electrical conductivity. At the same time, the intermediate layer acts to enhance the adhesion or bonding between the base material and the electrode coating.

Accordingly, the present invention provides electrolytic electrodes which have sufficient durability when used in electrolysis for the generation of oxygen or electrolysis in which oxygen is generated as a side reaction. Such processes have heretofore been considered difficult to perform with conventional electrodes.

The present invention is explained in greater detail below.

In the production of the electrode substrate of the present invention, corrosion-resistant, electrically-conductive metals, e.g., Ti, Ta, Nb, and Zr, and their base alloys can be used. Suitable examples are metallic Ti, and Ti-base alloys, e.g., Ti—Ta—Nb and Ti—Pd, which have heretofore been commonly used. The electrode base material can be in any suitable form such as in the form of a plate, a perforated plate, a rod, or a net-like member.

The electrode substrate of the present invention may be of a type coated with a platinum group metal such as Pt or a valve metal such as Ta and Nb in order to increase corrosion resistance or enhance the bonding between the substrate and the intermediate layer.

The intermediate layer is provided on the abovedescribed electrode substrate and comprises a mixed oxide of an oxide of Ti and/or Sn having a valance number of 4 and an oxide of at least one member selected from the group consisting of Al, Ga, Fe, Co, Ni and Tl having a valence number of 2 or 3.

An electrolytic electrode comprising an electrode substrate of an electrically conductive metal such as Ti and an electrode coating of a metal oxide, wherein an intermediate layer of a mixed oxide of an oxide of Ti and/or Sn and an oxide of Ta and/or Nb is provided between the substrate and the electrode coating is disclosed in U.S. Pat. Nos. 4,471,006 and 4,484,999. This electrode is resistant to passivation and excels in durability. The intermediate layer used in the electrode exhibits good conductivity as an N-type semiconductor. However, since the intermediate layer has limited carrier concentration, further improvement with respect to conductivity was desired.

Due to the concept of providing an intermediate layer possessing much higher conductivity than the intermediate layer of the electrode of these patents, the present invention has made it possible to produce an electrode which eliminates the drawback suffered by the electrode of these patents and offers still higher conductivity and durability.

As the substance to make up the intermediate layer contemplated by this invention, a mixed oxide of an oxide of Ti and/or Sn and an oxide of at least one member selected from the group consisting of Al, Ga, Fe, Co, Ni and Tl has been demonstrated to suit the purpose of this invention and provide an outstanding effect. The substance of the intermediate layer provides excellent resistance to corrosion, exhibits no electrochemical activity, and possesses ample conductivity. The term "oxide" or "mixed oxide" is meant to embrace solid solutions of metal oxides and metal oxides which are nonstoichiometric or have lattice defects. As used in this invention, the expression "$TiO_2$", "$SnO_2$", "$Al_2O_3$", "$Ga_2O_3$", "$FeO$", "$Fe_2O_3$", "$CoO$", "$Co_2O_3$", "$NiO$", "$Tl_2O_3$", etc. and the term "mixed oxide" embrace solid solutions of such metal oxides and those metal oxides nonstoichiometric or having lattice defects, for the sake of convenience.

The substance of the intermediate layer, as described above, is any combination of an oxide of a metal having a valence of 4 (Ti or Sn), and an oxide of a metal having a valence of 2 or 3 (Al, Ga, Fe, Co, Ni and Tl).

Specifically, any of the mixed oxides $TiO_2$—$Al_2O_5$, $TiO_2$—$Ga_2O_3$, $SnO_2$—$FeO$, $SnO_2$—$CoO$, $TiO_2$—$SnO_2$—$Co_2O_3$, $TiO_2$—$SnO_2$—$NiO$, $TiO_2$—$Al_2O_3$—$Tl_2O_3$, $SnO_2$—$Ga_2O_3$—$Fe_2O_3$ and $TiO_2$—$SnO_2$—$Al_2O_3$—$Ga_2O_3$ can be used advantageously to achieve an ample effect.

The proportions of the component oxides of the mixed oxide are not specificaly defined and a wide range of proportions may be used. For protected retention of durability and conductivity of the electrode, it is desirable for the ratio of the oxide of the tetravalent metal to the oxide of the divalent or trivalent metal to be in the range of about 95:5 to about 60:40 by the weight of metal. When the content of the oxide of the divalent or trivalent metal is not more than about 5% by weight substantially no improvement is observed as to the performance of the electrode, and the durability of the electrode decreases with not less than about 40% by weight of the oxide of divalent or trivalent metal.

The formation of the intermediate layer in the electrode can be advantageously effected by the thermal decomposition method which comprises the steps of applying a mixed solution containing chlorides or other salts of component metals destined to make up the aforementioned intermediate layer to the metal substrate and then heating the coated substrate in an atmosphere of an oxidizing gas at temperatures of about 350° to 600° C. thereby producing a mixed oxide. Other methods may be adopted if desired so long as the method is capable of forming a homogeneous, compact coating. By the afore-mentioned thermal decomposition method, Ti, Sn, Al, Ga, Fe, Co, Ni and Tl are readily converted into their corresponding oxides.

The amount of the substance of the intermediate layer to be applied to the substrate is preferably exceeds about $5 \times 10^{-3}$ mol/m$^2$ calculated as metal. If the amount is less than about $5 \times 10^{-3}$ mol/m$^2$ mentioned above, the intermediate layer consequently formed does not provide sufficient effects.

The thus-formed intermediate layer is then coated with an electrode active substance which is electrochemically active to produce the desired product. Suitable examples of such electrode active substances are metals, metal oxides or mixtures thereof, which have superior electrochemical characteristics and durability. The type of the active substance can be determined appropriately depending on the electrolytic reaction in which the electrode is to be used. Active substances particularly suitable for the above-described electrolytic processes in which the generation of oxygen is involved include: platinum group metal oxides, and mixed oxides of platinum group metal oxides and valve metal oxides. Typical examples include: Ir oxide, Ir oxide-Ru oxide, Ir oxide-Ti oxide, Ir oxide-Ta oxide, Ru oxide-Ti oxide, Ir oxide-Ru oxide-Ta oxide, and Ru oxide-Ir oxide-Ti oxide.

The electrode coating can be formed in any suitable manner, e.g., by thermal decomposition, electrochemical oxidation, or powder sintering. A particularly suitable technique is the thermal decomposition method as described in detail in U.S. Pat. Nos. 3,711,385 and 3,632,498.

The exact reason why the provision of the intermediate layer, i.e., the layer of the mixed oxide of 4-valent and 2- or 3-valent metals, between the metal electrode substrate and the electrode active coating produces the above-described results is not well understood. However, while not desiring to be bound the reason is believed as follows.

Crystallographically, it is confirmed that Al, Ga, Fe, Co, Ni and Tl are in substantially a 6-coordination state and the ionic radii of these metals in a 6-coordination state vary within the range between the value by about 10% larger than and the value by about 10% smaller than that of Ti or Sn. This indicates that the mixed oxides of the metals form a layer of a uniform, dense solid solution or mixed oxide composed mainly of a rutile type crystal phase. Since such an intermediate layer has a high resistance to corrosion, the surface of the substrate covered with the dense metal mixed oxide intermediate layer is protected from oxidation, and hence passivation of the substrate is prevented.

In the intermediate layer, the 4-valent and 2-or 3-valent metals are present simultaneously as oxides. Therefore, according to generally known principles of Controlled Valency, the intermediate layer becomes an p-type semi-conductor having a very high electrical conductivity. Moreover, where metallic Ti, for example, is used as a substrate, even when electrically nonconductive Ti oxides are formed on the surface of the substrate during the production of the electrode or during the use of the electrode in electrolysis, the 2- or 3-valent metal in the intermediate layer diffuses and renders the Ti oxides semi-conductors. Accordingly, the electrical conductivity of the electrode is maintained and passivation is prevented.

In addition, the intermediate layer substance which is composed mainly of rutile type oxides enhances the adhesion or bonding between the substrate of, e.g., metallic Ti, and the electrode active coating of, e.g., platinum group metal oxides and valve metal oxides, and hence increases the durability of the electrode.

The present invention is described in greater detail by reference to the following examples which are in no way intended to limit the present invention. Unless otherwise indicated herein, all parts, percents, ratios and the like are by weight.

EXAMPLE 1

A commercially available Ti plate having a thickness of 1.5 mm and a size of 50 mm × 50 mm was degreased with acetone. Thereafter, the plate was subjected to an etching treatment using a 20% aqueous hydrochloric acid solution maintained at 105° C. The thus treated Ti plate was used as an electrode substrate.

A 10% hydrochloric acid mixed solution of cobalt chloride, containing 10 g/l of Co, and titanium chloride containing 10.4 g/l of Ti, was coated on the Ti plate electrode substrate and dried. Thereafter, the plate was heated for 10 minutes in a muffle furnace maintained at 450° C. This procedure was repeated five times to form an intermediate layer of a $4.0 \times 10^{-2}$ mol/m$^2$ TiO$_2$—Co$_2$O$_3$ mixed oxide (weight ratio of Ti to Co=88:12) on the Ti substrate.

A butanol solution of iridium chloride containing 50 g/l of Ir was coated on the above-formed intermediate layer and heated for 10 minutes in a muffle furnace maintained at 500° C. This procedure was repeated three times to produce an electrode with Ir oxide, containing 2.0 g/m$^2$ of Ir, as an electrode active substance.

With the thus-produced electrode as an anode and a graphite plate as a cathode, accelerated electrolytic testing was performed in a 150 g/l sulfuric acid electrolyte at 60° C., and at a current density of 100 A/dm$^2$. The results demonstrated that this electrode could be used in a stable manner for 150 hours.

For comparison, an electrode was produced in the same manner as above except that the intermediate layer was not provided. This electrode was also tested in the same manner as above. The results demonstrated that this electrode was passivated in 20 hours and could no longer be used.

Further, an electrode was produced in the same manner as above except that instead of TiO$_2$—Co$_2$O$_3$, a mixed oxide of SnO$_2$ doped with antimony oxide in an amount of 20% by weight calculated as Sb$_2$O$_3$ was used as the intermediate layer. When tested in the same manner as above this electrode showed peeling off of the electrode active substance layer in 45 hours and could no longer be used.

EXAMPLE 2

An electrode was produced in the same manner as in Example 1 except that an intermediate layer of a TiO$_2$—Al$_2$O$_3$ mixed oxide (weight ratio of Ti to Al=87.7:12.3) was provided. The thus-produced electrode was tested in the same manner as in Example 1. The results demonstrated that this electrode could be used for longer than 60 hours.

EXAMPLE 3

A commercially available Ti plate having a thickness of 1.5 mm and a size of 50 mm × 50 mm was degreased with acetone. Thereafter, the plate was subjected to an etching treatment using oxalic acid maintained at 80° C. for 12 hours. The thus-treated Ti plate was used as an electrode substrate. Various electrodes were produced by coating the electrode substrate with the intermediate layer shown in Table 1 below and an electrode active substance in the same manner as in Example 1. $RuO_2$—$IrO_2$ (weight ratio of Ru to Ir is 50:50) was used as the electrode active substance for each electrode. These electrodes were subjected to accelerated electrolytic testing to determine their durability as an anode. The accelerated electrolysis was performed in an aqueous 100 g/l sulfuric acid solution as the electrolyte at 40° C. and at a current density of 200 A/dm² with a graphite plate as the cathode. The results obtained are shown in Table 1 below.

TABLE 1

| Run No. | Intermediate Layer | Service Life (hours) |
|---|---|---|
| 1 | $TiO_2$—$SnO_2$—$Fe_2O_3$ (22.8:70.6:6.6) | 70 |
| 2 | $TiO_2$—$SnO_2$—NiO (30.5:63.5:6.0) | 64 |
| 3 | $TiO_2$—$SnO_2$—$Ga_2O_3$ (25.3:47.1:27.6) | 48 |
| 4 | $SnO_2$—$Co_2O_3$ (82.5:17.5) | 54 |
| 5 | $SnO_2$—$Tl_2O_3$ (70.0:30.0) | 60 |
| 6 (Comparison) | $TiO_2$ | 30 |
| 7 (comparison) | $SnO_2$—$Sb_2O_3$ (80:20) | 18 |

Note:
The numerical values given in parentheses represent the weight ratios of component metals present.

From the results in Table 1, it can be seen that electrodes incorporating an intermediate layer of this invention had decisively longer service life and exhibited higher durability than electrode (comparison) incorporating a conventional intermediate layer.

EXAMPLE 4

Four electrodes as described in Table 2 below were produced in the same manner as in Example 1. These electrodes were subjected to accelerated electrolytic testing. The accelerated electrolytic testing was performed in a 12N aquebus NaOH solution at 95° C. and at a current density of 250 A/dm². $RuO_2$—$IrO_2$ (weight ratio of Ru to Ir is 50:50) was used as the electrode active substance for each electrode. The results are shown in Table 2.

TABLE 2

| Run No. | Intermediate Layer | Service Life (hours) |
|---|---|---|
| 1 | $TiO_2$—$SnO_2$—$Co_2O_3$ (10.4:76.9:12.7) | 16 |
| 2 | $SnO_2$—$Fe_2O_3$ (90.6:9.4) | 10 |
| 3 (Comparison) | — | 3 |
| 4 (comparison) | ($SnO_2$—$Sb_2O_3$) + $SnO_2$ Powder (80:20) | 5 |

Note:
The numerical values given in parentheses represent the weight ratios of component metals present.

It can be seen from the results in Table 2 that the electrodes of this invention have superior durability and thus service life, to the comparative electrode.

As stated hereinabove, the electrodes of this invention shows excellent durability in electrochemical processes, particularly those in which generation of oxygen is involved, and can be used as various types of electrodes such as an electrolytic electrode and an electric cell or battery electrode.

While the present invention has been described in detail and with reference to specific embodiments thereof, it will be apparent to one skilled in the art that various changes and modifications can be made therein without departing from the spirit and scope thereof.

What is claimed is:

1. An electrolytic electrode consists essentially of:
   (a) an electrode substrate of an electrically-conductive metal;
   (b) an electrode coating of an electrode active substance; and
   (c) an intermediate layer provided between the electrode substrate (a) and the electrode coating (b), wherein said intermediate layer (c) comprising a mixed oxide of
      (i) an oxide of at least one member selected from the group consisting of titanium and tin, each having a valence number of 4, in an amount of about 60 to about 95% by weight based on the weight of metal, and
      (ii) an oxide of at least one member selected from the group consisting of aluminum, gallium, iron, cobalt, nickel and thallium, each having a valence number of 2 or 3, in an amount of about 5 to about 40% by weight based on the weight of metal.

2. An electrode as claimed in claim 1, wherein said electrode substrate (a) is one of titanium, tantalum, niobium, or zirconium or an alloy thereof.

3. An electrode as claimed in claim 1, wherein said intermediate layer (c) comprises an electroconductive mixed oxide of
   (i) $TiO_2$ and/or $SnO_2$ and
   (ii) at least one member selected from the group consisting of $Al_2O_3$, $Ga_2O_3$, FeO, $Fe_2O_3$, CoO, $Co_2O_3$, NiO and $Tl_2O_3$.

4. An electrode as claimed in claim 1, wherein said electrode active substance contains a platinum-group metal or an oxide thereof.

5. A process for producing an electrolytic electrode, comprising the steps of:
   (1) coating an electrode substrate of an electrically conductive metal with a solution containing (i) salt(s) of Ti and/or Sn, and (ii) salt(s) of at least one metal selected from the group consisting of Al, Ga, Fe, Co, Ni and Tl to provide a coated electrode substrate;
   (2) heating in an oxidizing atmosphere the electrode substrate coated with said solution in step (1), thereby forming on said substrate an intermediate layer consists essentially of a mixed oxide of
      (i) an oxide of at least one member selected from the group consisting of Ti and Sn in an amount of about 60 to about 95% by weight based on the weight of metal, and
      (ii) an oxide of at least one member selected from the group consisting of Al, Ga, Fe, Co, Ni and Tl, in an amount of about 5 to about 40% by weight based on the weight of metal; and
   (3) subsequently coating said intermediate layer with a layer of an electrode active substance.

6. A method as claimed in claim 5, wherein said coating of the intermediate layer with said electrode active substance is carried out by thermal decomposition.

7. A process as claimed in claim 5, wherein said intermediate layer is formed by heating the coated electrode substrate under an oxidizing atmosphere at about 350° to 600° C.

8. A process as claimed in claim 5, wherein said electrode substrate is one of titanium, tantalum, niobium, or zirconium or an alloy thereof.

9. A process as claimed in Claim 5, wherein said electrode active substance contains a platinum-group metal or an oxide thereof.

* * * * *